Jan. 23, 1951  J. D. REARDON  2,538,846
MICROSCOPE GAUGE AND OPTICAL SYSTEM THEREFOR
Filed March 13, 1947  3 Sheets-Sheet 1
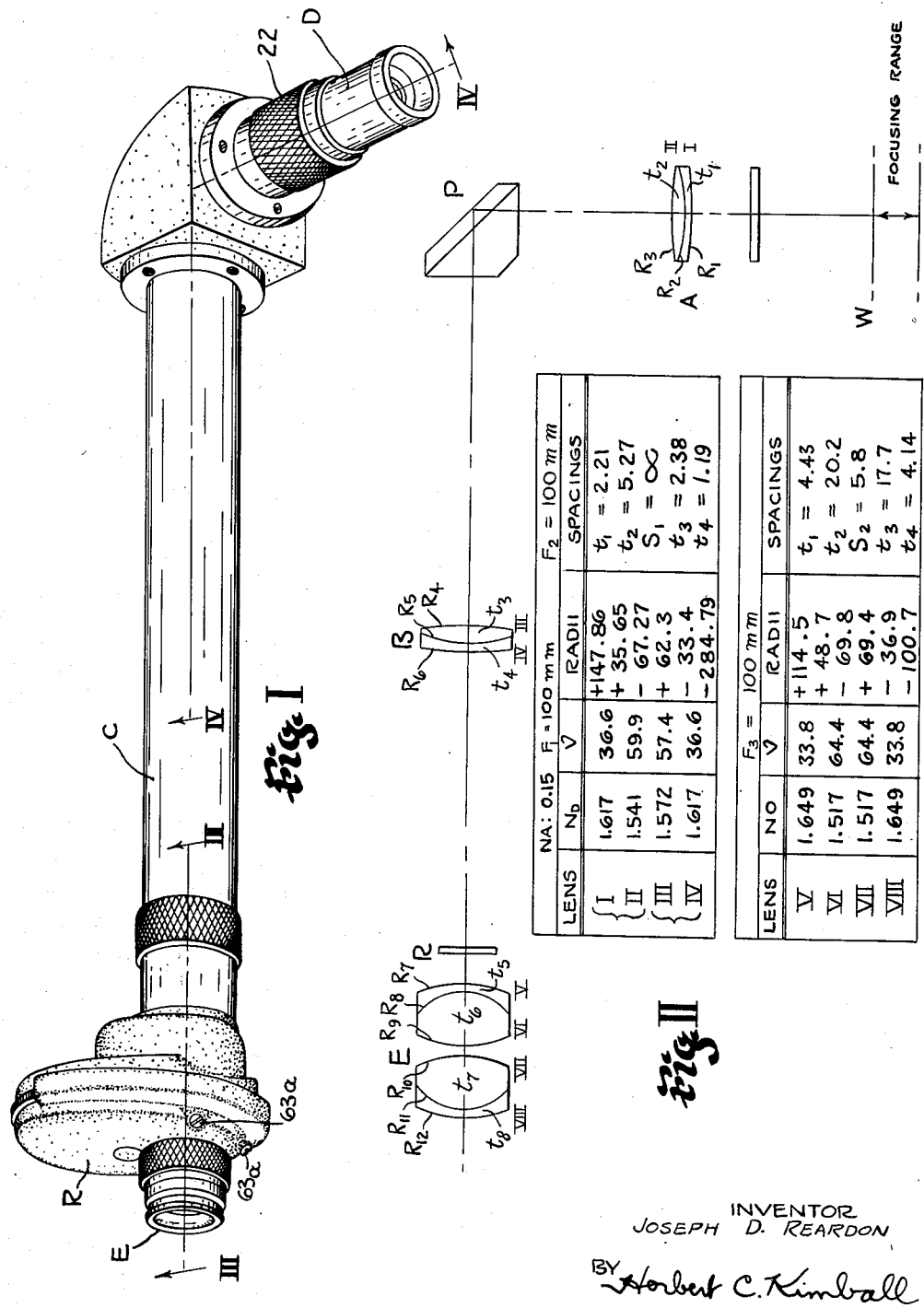
INVENTOR
JOSEPH D. REARDON
BY Herbert C. Kimball
ATTORNEY Jan. 23, 1951  J. D. REARDON  2,538,846
MICROSCOPE GAUGE AND OPTICAL SYSTEM THEREFOR
Filed March 13, 1947  3 Sheets-Sheet 2
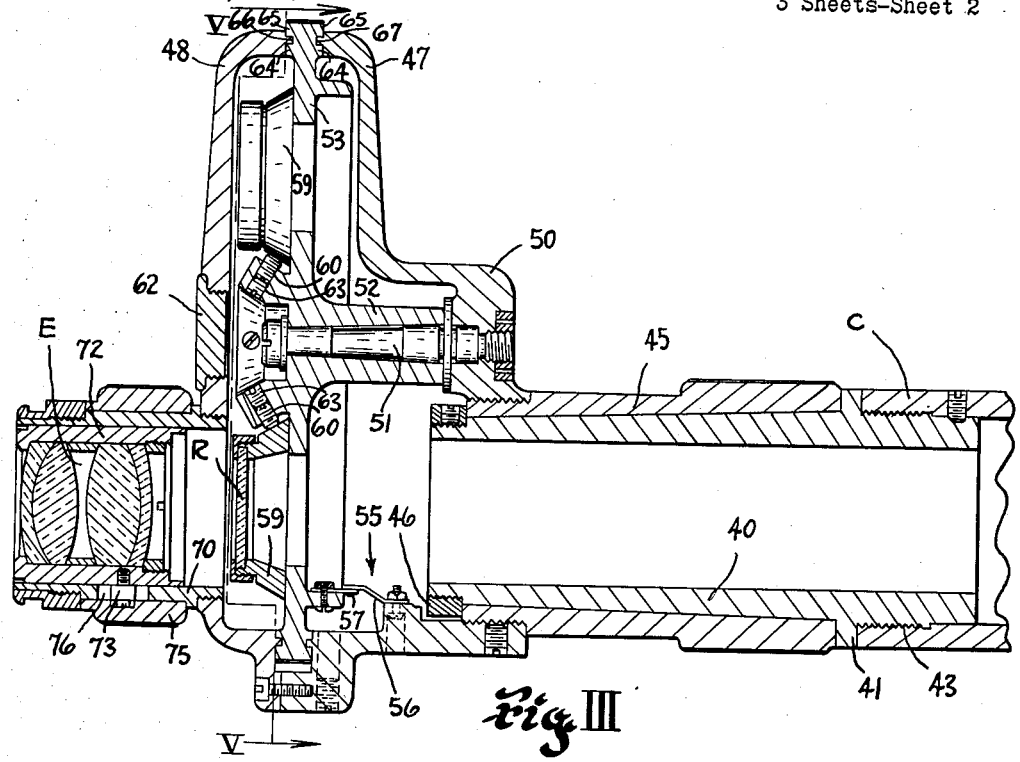
Fig. III
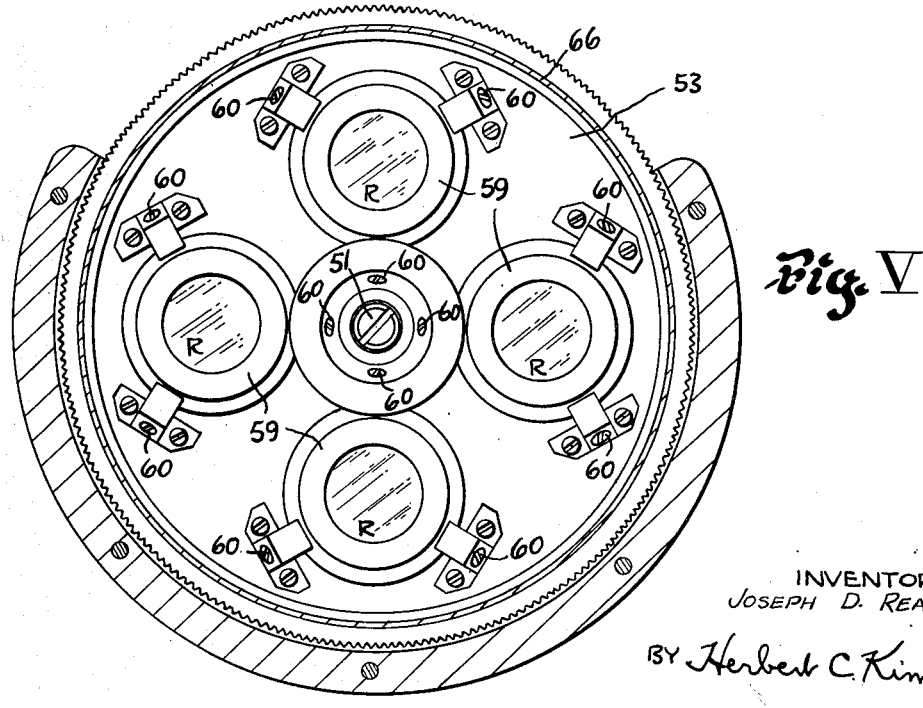
Fig. V
INVENTOR
JOSEPH D. REARDON
BY Herbert C. Kimball
ATTORNEY Jan. 23, 1951  J. D. REARDON  2,538,846
MICROSCOPE GAUGE AND OPTICAL SYSTEM THEREFOR
Filed March 13, 1947  3 Sheets-Sheet 3
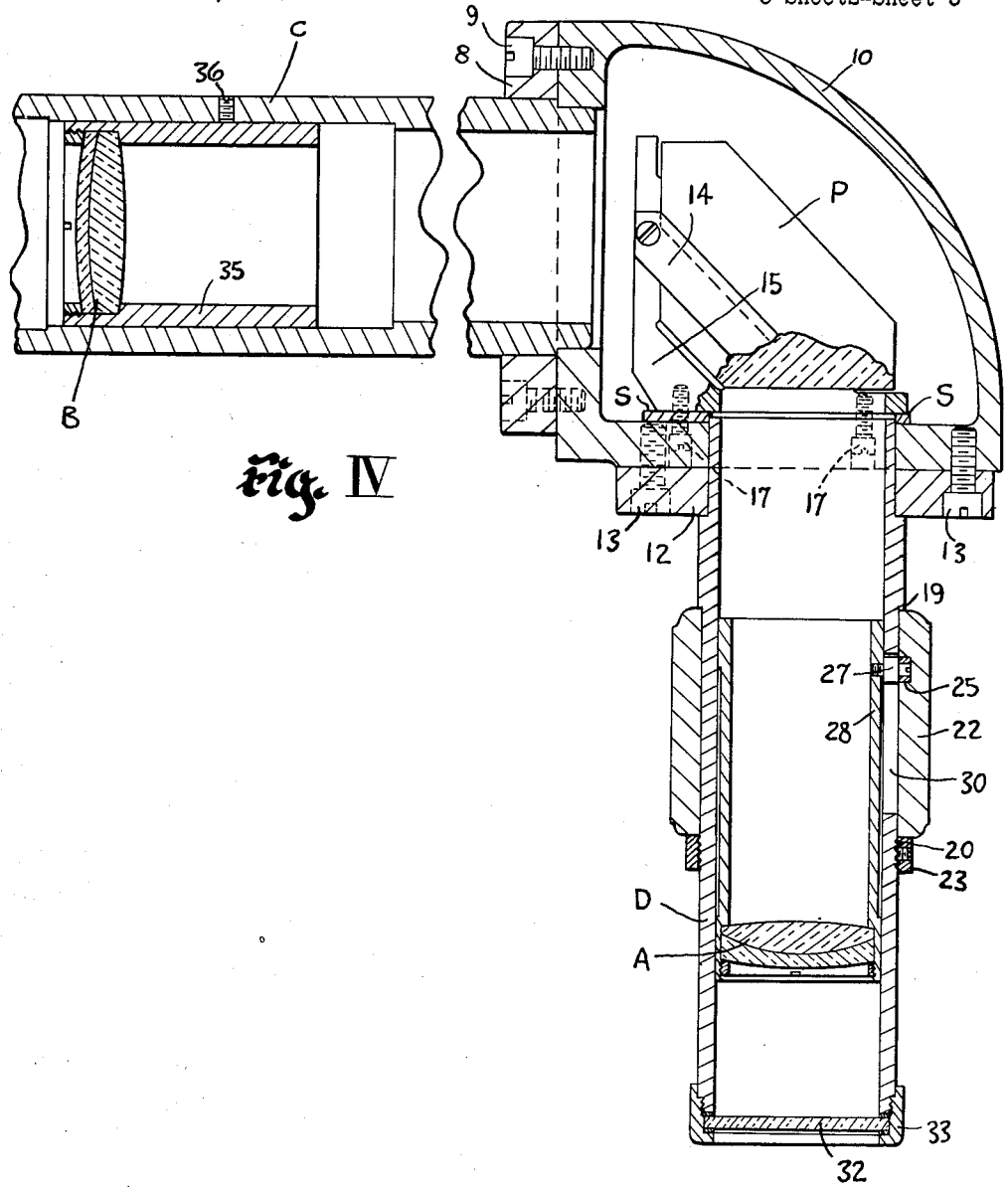
INVENTOR
JOSEPH D. REARDON
BY Herbert C. Kimball
ATTORNEY Patented Jan. 23, 1951

2,538,846

UNITED STATES PATENT OFFICE 2,538,846

MICROSCOPE GAUGE AND OPTICAL SYSTEM THEREFOR

Joseph D. Reardon, Buffalo, N. Y., assignor to American Optical Company, Southbridge, Mass., a voluntary association of Massachusetts Application March 13, 1947, Serial No. 734,415

4 Claims. (Cl. 88—39)

This invention relates to an optical system useful in a microscope for gauging and measuring a workpiece and for observing contours.

Certain requirements had to be met in order that the optical system should accomplish its purpose, and these requirements will be more clearly understood after consideration of the general characteristics of the microscope in which it is intended to function.

In the drawings:

Fig. I is a perspective view of the microscope;

Fig. II is a diagrammatic view of the optical system for the microscope;

Fig. III is a sectional view through the eyepiece and reticule, taken on the line III—III of Fig. 1;

Fig. IV is a sectional view through the objective lens system with cooperating prism, taken on the line IV—IV of Fig. I; and Fig. V is a detail face view of the battery of reticules employed with the microscope, taken on the line V—V of Fig. III.

This type of microscope is intended for gauging a workpiece or determining whether a contour being produced on a workpiece accurately conforms to the master contour. For the latter purpose a contour illuminator (whose essential feature is that the illumination projected therefrom be made up of parallel rays of light) may be used to silhouette the contour on the workpiece, and this silhouette is observed through the microscope. Frequently such silhouette is continuously observed during the grinding operation which produces the desired contour, and the operator keeps both the workpiece and the grinding wheel within the field of observation of the microscope, the silhouette being superimposed within the eyepiece on a given reticule of the battery of reticules.

Generally the task of the operator is rendered more comfortable and convenient if the eye of the operator is located at a considerable distance from the workpiece, and if his line of vision is generally horizontal instead of looking directly down upon the workpiece. Referring to Fig. I it will be noted that the eyepiece E and the adjacent cluster of reticules R are connected by a relatively long tube C with a shorter tube D aligned with the work, these two tubes C and D housing the optical system of the microscope. Ordinarily an optical path of such length would result in excessive magnification of the image.

Accordingly, it is an object of the present invention to provide an optical system for a microscope of this character in which the optical path is long and in which the magnification conforms to the requirements of the operator.

This purpose is accomplished in accordance with the present invention by dividing the objective into a first objective A and a second objective B and by turning the optical path through an angle (such as the right angle shown in Fig. I) by a roof prism P interposed between A and B, the first and second objectives being so devised that parallel light passes from the first to the second. Such infinity corrected optics permit the total optical path to be of the desired length without excessive magnification of the resulting image, while the roof prism P cooperates with the objectives in erecting the image so that the operator is not handicapped in controlling the grinding operation or other manipulation which he desires to accomplish.

The mechanical structure of the microscope can conveniently be made as follows: the tube C is threaded into a flange member 8 which in turn is connected by screws 9 to the housing 10 for the roof prism P. The tube D is likewise threaded into a flange member 12 which is secured by screws 13 to the prism housing 10, the tubes C and D being arranged at the proper angle (as illustrated, a right angle) to each other and aligned with the entrance and exit surfaces of the roof prism P. The latter is connected by a clamp 14 to a prism carrier 15. This carrier 15 is secured by screws 17 to an accurately machined surface S surrounding the adjacent end of the tube D.

The tube D is of reduced outer diameter from a shoulder 19 to a threaded portion 20, from which portion the remainder of the tube D is of still further reduced outer diameter. A knurled sleeve 22 fits over the reduced portion between the shoulder 19 and the threaded portion 20, and is held against longitudinal movement along the tube D by the shoulder 19 at one end and a nut 23 secured on the threaded portion 20. A spiral groove 25 is formed in the interior of the knurled sleeve 22 to receive the projecting end of a stud 27 threaded into a lens mount 28. The stud 27 extends through a vertical slot 30 in the tube D, this portion of the stud 27 carrying a small roller for reducing friction against the wall of the slot 30.

When the knurled sleeve 22 is rotated, it is prevented from moving longitudinally of the tube D by the shoulder 19 and by the nut 23. The slot 30 prevents rotation of the mount 28 within the tube D and the spiral groove 25 causes longitudinal movement of the mount 28 so as to position the first objective A at the proper working distance from the work W.

In order to protect the lenses of the first objective A from grease and grime, a window is provided at the lower end of tube D in the form of a parallel plate 32 of transparent material such as glass or plastic. This plate 32 is held against the lower end of tube D by a threaded flange 33.

The lenses of the second objective B are carried in a mount 35 which may be adjusted longitudinally of the tube C to bring about accurate focusing of the resulting image in the plane of the reticule R. The mount 35 is then held in adjusted position by the set screw 36.

A neck member 40 having a positioning flange 41 forms an extended portion of the tube C, being connected to the body portion of the tube C by threads 43. On the tapered exterior of the neck member 40 is mounted a collar 45 whose interior is correspondingly tapered. A nut 46 threaded on the end of the neck member 40 forces the tapered collar 45 towards the flange 41.

The housing for the battery of reticules is threaded on the outer end of the collar 45 and carries in optical alignment with the second objective B the eyepiece E. This housing is in two parts, 47 and 48, the first being threaded on the collar 45 and the second carrying the eyepiece E. The part 47 is provided with an enlarged portion 50 carrying a stud 51. The hub 52 of the reticule carrier 53 is journalled on the stud 51. A click mechanism 55 is provided for causing any given reticule to register in accurate alignment with the optical axis of the microscope. This mechanism 55 includes a leaf spring 56 carried by the housing 47 and a series of projections 57 cooperating therewith and carried by the carrier 53. The cell 59 for each reticule R is held against an accurately machined surface of the carrier 53 by three positioning set screws 60. One set screw 60 for each cell is located adjacent the stud 51 and access thereto is afforded by a removable plug 62. Each set screw is locked in place by a second set screw 63 after such adjustment. The two outwardly disposed set screws 60 for each cell are accessible through openings 63a (Fig. I) in the casing 48 which may be closed by a suitable closure member such as a plug. The two lateral sides of the periphery of the carrier 53 are provided with a double flange 64—65 so as to interengage with tongues 66 and 67 on the two parts 47 and 48 respectively of the reticule housing, thereby providing a seal for the interior of the housing. The periphery of the carrier 53 is knurled and is exposed throughout a substantial portion thereof so that the reticule carrier may be rotated on the stud 51 to bring the desired reticule R into alignment with the optical axis of the microscope.

The housing 70 for the eyepiece E is threaded into the part 48 of the reticule housing. The mounting 72 for the lenses of the eyepiece E is provided with a stud 73 similar to the previously described stud 27. The outer end of stud 73 engages in a spiral groove in the inner wall of a knurled sleeve 75; and upon rotation of the sleeve 75 the mount 72 is moved longitudinally of the housing 70, rotation of the mount 72 being prevented by the straight slot 76 in the housing 70. Such longitudinal movement of the mount 72 permits focusing of the eyepiece for properly observing the reticule R and the image superimposed thereon from the first and second objectives A and B.

From the foregoing description, it will be apparent that the operator can superimpose upon a selected reticule R a magnified image of the work W. If the microscope with its eyepiece E is carried by a support which cannot be readily adjusted toward and from the work the accurate positioning of the first objective A so that the image is in focus on the reticule R may be accomplished by adjusting the objective A through rotation of the knurled sleeve 22. This has no effect on magnification of the image since the light passing between the first objective A and the second objective B is parallel light.

The optical system to which the present invention relates will be described in connection with Fig. II. As above explained, there are two objectives of which the first objective A is adjacent the object to be observed and is adjustable longitudinally through the focusing range indicated in Fig. II. Such adjustment, with variations in the location of the object being observed, does not affect the magnification of the image observed through the eyepiece E, because the image plane of the objective A is substantially at infinity. The object plane of the second objective B is also substantially at infinity. Both objectives are cemented doublets made up of a negative flint element and a positive crown element. The arrangement of the second doublet is reversed from the arrangement of the first doublet, so that in each objective the outer element of the doublet is a negative flint element.

I have found it particularly advantageous in such a system that the objective adjacent the object to be observed have an object focal length about half the image focal length of the second objective. If the object focal length of the first objective be increased to approximate the magnitude of the image focal length of the second objective, the numerical aperture of the system is injuriously reduced unless the diameter of the second objective is inordinately increased.

I have obtained a system having a numerical aperture of 0.15 by using a first objective having the following specifications

[$F_1 = 100$ mm.]

| Lens | $N_D$ | V | Radii | Spacings |
|---|---|---|---|---|
| I | 1.617 | 36.6 | +147.86 | $t_1=2.21$ |
| II | 1.541 | 59.9 | +35.65 | $t_2=5.27$ |
|  |  |  | −67.27 |  | and a second objective having the following specifications

[$F_2 = 100$ mm.]

| Lens | $N_D$ | V | Radii | Spacings |
|---|---|---|---|---|
| III | 1.572 | 57.4 | +62.3 | $t_3=2.38$ |
| IV | 1.617 | 36.6 | −33.4 | $t_4=1.19$ |
|  |  |  | −284.79 |  | where the Roman numerals refer to elements starting with the object side of the microscope system, $N_D$ is the index of refraction with reference to the D line of the spectrum, V is the dispersive index, $t_1$ to $t_4$ are the axial thicknesses of the elements, and the + and − signs used with the radii of curvature of the surfaces (consecutive from front to rear) refer respectively to surfaces convex and concave to the front or object side of the system.

The image produced by the combination of the two objectives A and B and the interposed prism P is focused on the reticule, adjustment for focusing the objective B being provided by the set screw 36; and the operator observes through the eyepiece E the image of the work superimposed upon the appropriate reticule R. Any suitable eyepiece may be employed, but I prefer to use an optical system having approximately the following specifications, because its field matches closely the field of the combined objectives mentioned above

[$F_3 = 100$ mm.]

| Lens | $N_D$ | V | Radii | Spacings |
|---|---|---|---|---|
| V | 1.649 | 33.8 | +114.5 | $t_1 = 4.43$ |
| VI | 1.517 | 64.4 | +48.7 / −69.8 | $t_2 = 20.2$ |
| | | | | $S_2 = 5.8$ |
| VII | 1.517 | 64.4 | +69.4 / −36.9 | $t_3 = 17.7$ |
| VIII | 1.649 | 33.8 | −100.7 | $t_4 = 4.14$ |

In an instrument of the type shown in Fig. I, a lens system of this design has been employed in which the combined objectives give a magnification of 2.07X and the magnification given by the whole system including the eyepiece is 18.6X.

The improved optical system provided by the present invention has important advantages which follow from the improvements set forth above. The first objective A may be adjusted longitudinally of its optical axis as the operator finds his work at different locations relative to the support for the microscope as a whole. Such adjustment has no effect on the magnification obtained by the system due to the infinity correction. At the same time the shortened focal length of the first objective improves the numerical aperture of the system.

A further improvement results from the erecting of the image by the cooperation of the prism P with the two objectives. This is an infinity corrected system, and therefore the prism P which is interposed between these two objectives transmits parallel light. The path of such light through the prism is not changed by moving the objective A toward or from the object under observation.

Having thus described and explained my invention, I wish to point out that it is not limited to the structure shown but is of the scope of the appended claims.

Having described my invention, I claim:

1. In an optical system for a microscope having the working distance from the eyepiece variable to facilitate observation of objects variously located without changing the position of the eyepiece, the combination of a first objective adjacent the object to be observed and having its image plane substantially at infinity and having approximately the following specifications:

| Lens | $N_D$ | V | Radii | Thicknesses |
|---|---|---|---|---|
| I | 1.617 | 36.6 | $R_1 = +1.5\ F_1$ | $t_1 = 0.02\ F_1$ |
| II | 1.541 | 59.9 | $R_2 = +0.36\ F_1$ | $t_2 = 0.05\ F_1$ |
| | | | $R_3 = −0.67\ F_1$ | | and a second objective having its object plane substantially at infinity and cooperating with the first objective to form a real image, said second objective having approximately the following specifications:

| Lens | $N_D$ | V | Radii | Thicknesses |
|---|---|---|---|---|
| III | 1.572 | 57.4 | $R_4 = +0.62\ F_2$ | $t_3 = 0.02\ F_2$ |
| IV | 1.617 | 36.6 | $R_5 = −0.33\ F_2$ | $t_4 = 0.01\ F_2$ |
| | | | $R_6 = −2.85\ F_2$ | | where the first column designates the lens elements by Roman numerals in order from front to rear and where $F_1$ is the focal length of the first objective, $F_2$ is the focal length of the second objective, $N_D$ is the index of refraction for the D line of the spectrum, V is the dispersive index, R and $t$ refer respectively to the radii of curvature of the refractive surfaces and the thicknesses of the elements, the subscripts on these refer to the surfaces and the elements numbered consecutively from the front, and the + and − signs in the fourth column correspond to surfaces which are respectively convex and concave to the front, each of said objectives being a cemented doublet.

2. An infinity corrected optical system for use in a microscope having a recticule and an eyepiece optically aligned therewith for viewing said reticule, said infinity corrected optical system comprising a first objective having its image plane substantially at infinity, a second objective cooperating with the first objective to form a real image, the optical axes of said objectives intersecting at an angle, and a prism at said intersection and cooperating with said objectives to erect said image, said objectives having approximately the following specifications:

| Lens | $N_D$ | V | Radii | Thicknesses |
|---|---|---|---|---|
| I | 1.617 | 36.6 | $R_1 = +1.5\ F_1$ | $t_1 = 0.02\ F_1$ |
| II | 1.541 | 59.9 | $R_2 = +0.36\ F_1$ | $t_2 = 0.05\ F_1$ |
| | | | $R_3 = −0.67\ F_1$ | $S_1 = \infty$ |
| III | 1.572 | 57.4 | $R_4 = +0.62\ F_2$ | $t_3 = 0.02\ F_2$ |
| IV | 1.617 | 36.6 | $R_5 = −0.33\ F_2$ | $t_4 = 0.01\ F_2$ |
| | | | $R_6 = −2.85\ F_2$ | | where the first column designates the lens elements by Roman numerals in order from front to rear and where $F_1$ is the focal length of the first objective, $F_2$ is the focal length of the second objective, $N_D$ is the index of refraction for the D line of the spectrum, V is the dispersive index, R and $t$ refer respectively to the radii of curvature of the refractive surfaces and the thicknesses of the elements, the subscripts on these refer to the surfaces and the elements numbered consecutively from the front, and the + and − signs in the fourth column correspond to surfaces which are respectively convex and concave to the front, the spacing $S_1$ having no optical significance because the system is infinity corrected, and each of said objectives being a cemented doublet.

3. A microscope comprising a reticule, an infinity corrected optical system including a first objective having its image plane substantially at infinity, a second objective cooperating with the first objective to form a real image superimposed on said reticule, the optical axes of said objectives intersecting at an angle, and a prism at said intersection and cooperating with said objectives to erect said image, and an eyepiece for viewing the image superimposed on said reticule, said objectives and eyepiece having approximately the following specifications:

| Lens | $N_D$ | V | Radii | Thicknesses |
|------|-------|------|-------|-------------|
| I    | 1.617 | 36.6 | $R_1=+1.5\ F_1$ | $t_1=0.02\ F_1$ |
|      |       |      | $R_2=+0.36\ F_1$ |              |
| II   | 1.541 | 59.9 | $R_3=-0.67\ F_1$ | $t_2=0.05\ F_1$ |
|      |       |      |                  | $S_1=\infty$ |
|      |       |      | $R_4=+0.62\ F_2$ |              |
| III  | 1.572 | 57.4 | $R_5=-0.33\ F_2$ | $t_3=0.02\ F_2$ |
| IV   | 1.617 | 36.6 |                  | $t_4=0.01\ F_2$ |
|      |       |      | $R_6=-2.85\ F_2$ |              |
|      |       |      | $R_7=+1.15\ F_3$ |              |
| V    | 1.649 | 33.8 | $R_8=+.49\ F_3$  | $t_5=.04\ F_3$ |
| VI   | 1.517 | 64.4 | $R_9=-.7\ F_3$   | $t_6=.2\ F_3$ |
|      |       |      |                  | $S_2=.05\ F_3$ |
|      |       |      | $R_{10}=+.7\ F_3$ |             |
| VII  | 1.517 | 64.4 | $R_{11}=-.37\ F_3$ | $t_7=.18\ F_3$ |
| VIII | 1.649 | 33.8 | $R_{12}=-1.\ F_3$  | $t_8=.04\ F_3$ | where the first column designates the lens elements by Roman numerals in order from front to rear and where $F_1$ is the focal length of the first objective, $F_2$ is the focal length of the second objective, and $F_3$ is the focal length of the eyepiece, $N_D$ is the index of refraction for the D line of the spectrum, V is the dispersive index, R and t refer respectively to the radii of curvature of the refractive surfaces and the thicknesses of the elements, the subscripts on these refer to the surfaces and the elements numbered consecutively from the front, and the + and − signs in the fourth column correspond to surfaces which are respectively convex and concave to the front, the spacing $S_1$ having no optical significance because the system is infinity corrected, $S_2$ is the air space between components of the eyepiece, each of said objectives being a cemented doublet and both elements V and VI and elements VII and VIII of the eyepiece being cemented doublets.

4. A self-contained industrial microscope or like instrument for use with machine tools for observing the contour of workpieces or the like, said instrument having a main housing substantially completely enclosing the optical system thereof and comprising a short tubular arm, a long tubular arm, and a hollow prism box firmly secured to adjacent ends of said tubular arms and supporting said arms in predetermined fixed angular relation relative to each other, a first objective in said short tubular arm with its optical axis extending substantially parallel thereto, a second objective in said long tubular arm with its optical axis extending substantially parallel thereto, said axes intersecting each other in said prism box, a roof prism in said prism box substantially at said intersection and disposed so as to direct light rays from said first objective to said second objective, said first objective being axially adjustable within said short tubular arm for focusing upon a workpiece and having its image plane substantially at infinity, said second objective being disposed with its image plane coincident with a predetermined transverse focal plane in said instrument and its object plane substantially at infinity, said first and second objective together forming an infinity corrected optical system of substantially constant predetermined magnification, and in cooperation with said roof prism forming real upright images of workpieces under observation at said transverse plane, an auxiliary housing rotatably carried by the opposite free end of said long tubular arm for pivotal movement about the optical axis of said second objective and relative to said prism and first objective, a rotatable carrier within said auxiliary housing and mounted for pivotal movement about a center spaced from said last mentioned axis, said carrier supporting a plurality of reticules substantially equidistantly spaced from said center for selective movement into substantial alignment with said last mentioned axis and into said transverse focal plane, each reticule having means for initially laterally adjusting each of said reticules individually relative to said carrier so as to assume a desired position relative to said last mentioned optical axis when aligned therewith, and an eye piece carried by said instrument in optical alignment with said second objective and axially adjustable so as to be readily focused upon any one of said reticules when disposed in alignment therewith, the rotatable connection between said long tubular and said auxiliary housing allowing any preadjusted reticule aligned with said second objective to be readily rotated with respect to the configuration of the workpiece being observed.

JOSEPH D. REARDON.

REFERENCES CITED

The following references are of record in the file of this patent:

UNITED STATES PATENTS

| Number | Name | Date |
|--------|------|------|
| 1,589,797 | Eppenstein | June 22, 1926 |
| 1,649,068 | Kohler | Nov. 15, 1927 |
| 1,865,977 | Sonnefeld | July 5, 1932 |
| 2,079,791 | Cook | May 11, 1937 |
| 2,342,828 | Armitage et al. | Feb. 29, 1944 |
| 2,368,434 | Turrettini | Jan. 30, 1945 |
| 2,389,503 | Guellich | Nov. 20, 1945 |
| 2,389,544 | Peck et al. | Nov. 20, 1945 |

FOREIGN PATENTS

| Number | Country | Date |
|--------|---------|------|
| 313,322 | Great Britain | June 13, 1929 |
| 591,558 | Germany | Jan. 24, 1934 |
| 544,369 | Great Britain | Apr. 10, 1942 |